(12) United States Patent
Biermann

(10) Patent No.: US 6,984,187 B2
(45) Date of Patent: Jan. 10, 2006

(54) MULTI-STAGE GEARBOX

(75) Inventor: Eberhard Biermann, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 64 days.

(21) Appl. No.: 10/472,986

(22) PCT Filed: Mar. 27, 2002

(86) PCT No.: PCT/EP02/03438

§ 371 (c)(1),
(2), (4) Date: Sep. 26, 2003

(87) PCT Pub. No.: WO02/079665

PCT Pub. Date: Oct. 10, 2002

(65) Prior Publication Data

US 2004/0147358 A1    Jul. 29, 2004

(30) Foreign Application Priority Data

Mar. 30, 2001    (DE) .............................. 101 15 985

(51) Int. Cl.
*F16H 37/02*    (2006.01)
*F16H 3/62*    (2006.01)
*F16H 3/44*    (2006.01)

(52) U.S. Cl. ...................... 475/275; 475/215; 475/218; 475/219; 475/276; 475/280; 475/302

(58) Field of Classification Search ............... 475/214, 475/215, 217–219, 275–293, 295–297, 302, 475/311–313, 317–319, 323–325, 329, 330
See application file for complete search history.

(56) References Cited

U.S. PATENT DOCUMENTS

| | | | | |
|---|---|---|---|---|
| 2,890,603 A | * | 6/1959 | Miller et al. ................. | 475/134 |
| 3,487,723 A | * | 1/1970 | Piot ............................ | 475/276 |
| 4,523,493 A | * | 6/1985 | Wei.beta. ..................... | 475/205 |
| 4,774,856 A | * | 10/1988 | Hiraiwa ....................... | 475/285 |
| 6,203,463 B1 | | 3/2001 | Casey et al. | |
| 6,607,464 B1 | * | 8/2003 | Bauer et al. ................. | 475/269 |

FOREIGN PATENT DOCUMENTS

| | | |
|---|---|---|
| DE | 4238025 | 11/1992 |
| DE | 19949507 | 10/1999 |
| EP | 0239205 | 4/1991 |
| JP | 62056652 | 3/1987 |
| JP | 05187489 | 7/1993 |
| JP | 05187491 | 7/1993 |
| JP | 05187492 | 7/1993 |
| JP | 2000310301 | 11/2000 |

\* cited by examiner

*Primary Examiner*—Tisha Lewis
(74) *Attorney, Agent, or Firm*—Davis & Bujold, P.L.L.C.

(57) ABSTRACT

A multi-stage gearbox with a drive input shaft connected to a reduction planetary gear set, with a drive output shaft connected to a main planetary gear set, and with shift elements. An input speed of the drive input shaft can be transferred, by the engagement of at least seven forward gears to the drive output shaft, in such manner that to shift from one gear to the next-higher or next-lower gear, only one shift element is disengaged and another shift element is engaged. The reduction planetary gear set has an output shaft rotating at an output speed of the reduction planetary gear set. The main planetary gear set is connected to the drive input shaft. The main planetary gear set is connected to the output shaft of the reduction planetary gear set.

13 Claims, 3 Drawing Sheets

| Gear | Engaged Shift Elements | | | | | | Gear Ratio | Step | Ratio Spread |
|---|---|---|---|---|---|---|---|---|---|
| | A | B | D | M | H | L | | | |
| 1 | | | | | | O | 5.60 | 1.75 | |
| 2 | | | O | O | | O | 3.20 | 1.44 | |
| 3 | | | O | O | | | 2.22 | 1.41 | |
| 4 | | O | | O | | | 1.58 | 1.30 | 8.6 |
| 5 | O | | | O | | | 1.22 | 1.22 | |
| 6 | | | O | | O | | 1.00 | 1.18 | |
| 7 | O | | | | O | | 0.85 | 1.15 | |
| 8 | | O | | | O | | 0.74 | 1.14 | |
| 9 | | | O | | O | | 0.65 | | |
| R | O | | | | | O | -5.60 | | |

Stationary Gear Ratio $i_{0\,VS1} = -3.00$    $i_{Stirn1} = -1.0$    $i_{0\,NS1} = -2.20$ $i_{0\,VS2} = -2.00$    $i_{Stirn2} = -1.0$    $i_{0\,NS2} = -2.80$

MULTI-STAGE GEARBOX

This application is a national stage completion of PCT/EP02/03438 filed Mar. 27, 2002 which claims priority from German Application Serial No. 101 15 985.4 filed Mar. 30, 2001.

FIELD OF THE INVENTION

The present invention concerns a multi-stage gearbox.

BACKGROUND OF THE INVENTION

In the older German Patent Application No. DE 199 49 507 A1 by the present applicant several gearbox designs for an automatic multi-stage gearbox with various combinations of coupled planetary gear sets are described. By a suitable connection of a non-shifting reduction planetary gear set combination to a shiftable main planetary gear set combination, at least seven respective forward gears can be engaged without range-change. The number of engageable forward gears is here at least two more than the number of shift elements. The reduction and main planetary gear sets are in this case always arranged coaxially with one another.

For the above case DE 199 49 507 A1 proposes that the shiftable main planetary gear set combination be made as a two-web/four-shaft transmission with two shiftable main planetary gear sets. Here, two-web/four-shaft transmission is understood to mean an arrangement of two individual mechanically coupled one-web planetary gear sets, in which the coupled unit has four so-termed "free shafts" owing to duplicated component connection, where a "shaft" can be a solar gearwheel, an annular gearwheel or even a web of a planetary gearwheel assembly.

Starting from the said state of the art, the purpose of the present invention is to provide a multi-stage gearbox with a non-coaxial arrangement of the drive input and drive output shafts and at least seven forward gears that can be engaged without range-change, developed further in relation to structural volume, with comparatively low construction cost, suitable gear ratio steps and a larger spread.

SUMMARY OF THE INVENTION

Beginning from the prior art of DE 199 49 507 A1 the multi-stage gearbox comprises a reduction planetary gear set connected to the drive input shaft of the transmission and a main planetary gear set connected to the drive output shaft of the transmission, as well as several shift elements.

In this, the reduction planetary gear set is preferably made as a two-web/four shaft transmission with two coupled, shiftable reduction planetary gear sets or with two coupled, non-shiftable reduction planetary gear sets or with two mutually independent reduction planetary gear sets, one shiftable and the other not. Here, "independent" means that each of the two reduction planetary gear sets produces a rotation speed which is unaffected by any active connection between the two reduction planetary gear sets. The output speed of the reduction planetary gear set is in this case, therefore, produced either by the first or by the second reduction planetary gear set, but not by both at the same time.

The main planetary gear set is preferably made as a two-web/four shaft transmission with two coupled, shiftable main planetary gearwheel assemblies.

Obviously, other designs of the reduction and main planetary gear sets can be provided, for example, with fewer or more coupled planetary gear sets, with any desired number of component couplings within the reduction and main planetary gear sets and with fixed spur gear stages instead of planetary gearwheel assemblies in the reduction planetary gear set and/or the main planetary gear set.

According to the invention, the main planetary gear set can always be connected, via at least one shift element, to the drive input shaft of the gearbox and is always connected, via a non-shiftable mechanical connection, to the output of the reduction planetary gear set.

According to the invention, it is proposed that this non-shiftable mechanical connection between the reduction planetary gear set and the main planetary gear set, and the coupling of the main planetary gear set to the drive shaft, should be made as a spur gear or as a bevel gear or as a hypoid gear. In a particularly advantageous way, this structure enables compact, space-saving arrangements of the reduction and main planetary gear sets of the multi-stage gearbox for applications with non-coaxial drive input and output. The multi-stage gearbox constructed in this way, according to the invention, is particularly suitable for motor vehicles whose drive motor is arranged transversely to the driving direction ("front transverse drive", "rear transverse drive") or with the drive motor arranged longitudinally to the driving direction and front or rear drive.

By the selective shifting of shift elements that act on the reduction planetary gear set or by the component structure of the reduction planetary gear set and its connection to the drive input shaft of the gearbox, at the output of the reduction planetary gear set a certain rotation speed is produced at which the connecting shaft rotates, i.e., a spur gear pair or a bevel gear pair or a hypoid gear pair.

Each gear is engaged by means of at least two shift elements. When shifting from one gear to the next, only one shift element is disengaged and one other shift element is engaged, so that shifting-quality-critical, range-change shifts in which several shift elements have to be engaged or disengaged at the same time, are avoided.

BRIEF DESCRIPTION OF THE DRAWINGS

The invention will now be described, by way of example, with reference to the accompanying drawings in which:

FIG. 2A is a second embodiment of a multi-stage gearbox with a spur gear coupling between the reduction and main planetary gear sets according to the presently claimed invention; and.

DETAILED DESCRIPTION OF THE INVENTION

Figures 1A, 1B:
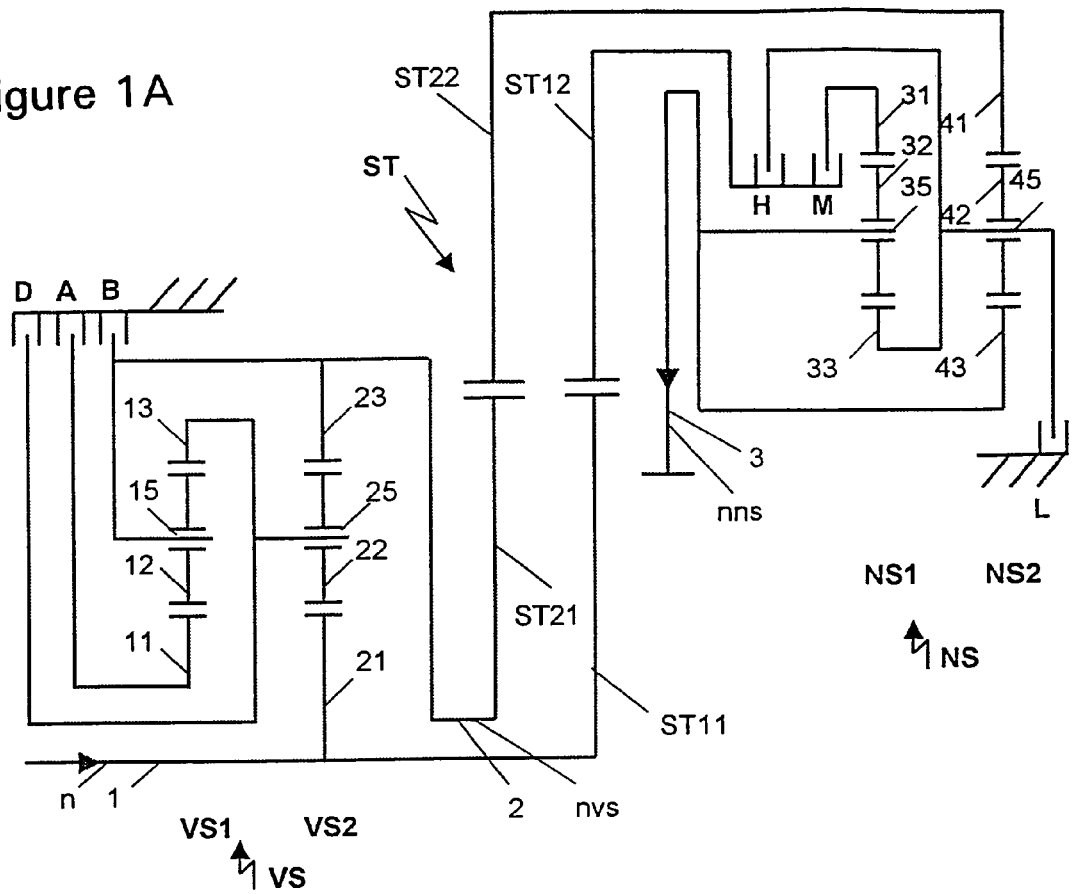
FIGS. 1A and 1B are a first embodiment of a multi-stage gearbox with a spur gear coupling between the reduction and main planetary gear sets according to the presently claimed invention;.

Corresponding to the respective embodiment, FIG. 1A shows a shift scheme of a multi-stage gearbox. FIG. 1B shows a shift logic pertaining to the embodiment, for example, a transmission ratio of individual gears, gear steps, transmission spread and constant ratio of an individual planetary gear sets.

To provide multi-stage gearboxes with at least seven forward gears that can be manufactured comparatively inexpensively relative to DE 199 49 507 A1, the reduction planetary gear set combination on the drive input shaft of the gearbox is made shiftable. By virtue of this arrangement, a further speed is produced in accordance with the shift elements actuated, which acts on the shiftably designed main planetary gear set combination on the drive output shaft, in addition to the input speed transmitted by the drive input shaft. In accordance with the actuation logic of the shift elements, the reduction planetary gear set can also be optionally blocked or fixed.

In the known multi-stage gearboxes described at the start, two additional speeds are produced by the reduction planetary gear set connected to the drive input shaft which, together with the drive input speed, act upon the main planetary gear set. In contrast to the present invention, these two speeds are produced by virtue of the arrangement of two non-shiftable reduction planetary gearwheel assemblies.

By actuating the shift elements in the present invention, the output speed of the reduction planetary gear set combination and the gearbox input speed are thus transferred to the drive output shaft in accordance with the force flow engaged. Owing to the particular arrangement of the shift elements and planetary gear sets, various multi-stage gearboxes with at least seven forward gears can be designed. Below is an example embodiment of the invention consisting of a nine-gear gearbox with a total of six shift elements and four planetary gear sets described in detail.

As already mentioned, other designs of the reduction and main planetary gear sets and a different number and different connections of the shift elements can obviously be provided.

In all the Figures, a drive input shaft of the gearbox is indexed 1 and a drive output shaft of the multi-stage transmission is indexed 3. In all cases, the multi-stage gearbox in all cases has a shiftable reduction planetary gear set VS and a shiftable main planetary gear set NS connected to an output shaft 2 of the reduction planetary gear set VS. The drive input shaft 1 rotates at an input speed n. When two shift elements of the reduction planetary gear set VS are engaged, i.e., closed in accordance with the shift logic of the gearbox, the output shaft 2 of the reduction planetary gear set VS rotates at an output speed nvs. The drive output shaft 3 rotates at an output speed nns of the main planetary gear set NS. VS1 and VS2 denote a first and second reduction planetary gear assembly, and NS1 and NS2 denote a first and second main planetary gearwheel assembly. The gear set concept, i.e., the component-related coupling of the planetary gearwheel assembly components, is identical in the example embodiments illustrated. Also identical is the number and connection of the shift elements to the individual planetary gearwheel assembly components. Three shift elements A, B and D acting on a reduction planetary gear set VS and three shift elements M, H and L acting on a main planetary gear set NS are provided.

FIG. 1A now shows the gearbox scheme of a first example embodiment of a multi-stage gearbox, according to the invention, with two shiftable reduction planetary gearwheel assemblies VS1, VS2 and three shift elements A, B, D coupled to form a two-web, four shaft transmission unit constituting the reduction planetary gear set VS, and two shiftable main planetary gearwheel assemblies NS1, NS2 and three shift elements M, H, L coupled to form a two-web, four shaft transmission unit constituting the main planetary gear set NS. According to the invention, the reduction and main planetary gear sets VS and NS are connected by a spur gear arrangement ST such that the said arrangement ST comprises two spur gear stages. The first spur gear stage has a spur gearwheel ST11 on an input side and a spur gearwheel ST12 on an output side, and connects the drive input shaft 1 with a free shaft of the main planetary gear set NS, in this case to a central gearwheel of the first main planetary gearwheel assembly NS1. Analogously to the nomenclature of the first spur gear stage, a second spur gear stage comprises a spur gearwheels ST21 (input side) and a ST22 (output side) and connects the output shaft 2 of the reduction planetary gear set VS to another free shaft of the main planetary gear set NS, in this case, to a central gearwheel of the second main planetary gearwheel assembly NS2.

As shown in FIG. 1A, all four planetary gearwheel assemblies VS1, VS2, NS1 and NS2 are formed as minus-gears, each with a solar gearwheel 11, 21, 31 and 41, an annular gearwheel 13, 23, 33 and 43 and a web 15, 25, 35 and 45 with planetary gearwheels 12, 22, 32 and 42.

The solar gearwheel 11 of the first reduction planetary gearwheel assembly VS1 can be fixed by the first shift element A of the reduction planetary gear set VS, which is formed as a brake. The solar gearwheel 21 of the second shiftable reduction planetary gearwheel assembly VS2 is connected fast to the drive input shaft 1 (rotation speed n). The web 15 of the first reduction planetary gearwheel assembly VS1 and the annular gearwheel 23 of the second reduction planetary gearwheel assembly VS2 are coupled and can be fixed by the second shift element B of the reduction planetary gear set VS, which is formed as a brake. The annular gearwheel 13 of the first reduction planetary gearwheel assembly VS1 and the web 25 of the second reduction planetary gearwheel assembly VS2 are coupled and can be fixed by the third shift element D of the reduction planetary gear set VS, which is formed as a brake. The annular gearwheel 23 of the second reduction planetary gearwheel assembly VS2 and the coupled web 15 of the first reduction planetary gearwheel assembly VS1, at the same time, form the drive output of the reduction planetary gear set VS and are correspondingly connected to its output shaft 2 (rotation speed nvs).

According to the invention, the drive input shaft 1 is connected fast to a spur gearwheel ST11 of the first spur gear stage ST11/ST12, and the output shaft 2 of the reduction planetary gear set VS is connected fast to the spur gearwheel ST21 of the second spur gear stage ST21/ST22 of the spur gear arrangement ST. The spur gearwheel ST12 which meshes with the spur gearwheel ST11 can be connected with the solar gearwheel 31 of the first main planetary gearwheel assembly NS1 by means of the first shift element M of the main planetary gear set NS, which is made as a clutch, and by means of the second shift element H of the main planetary gear set NS, also made as a clutch, with the annular gearwheel 33 of the first main planetary gearwheel assembly NS1 and the web 45 of the second main planetary gearwheel assembly NS2 coupled to the annular gearwheel 33. A spur gearwheel ST22 which meshes with a spur gearwheel ST21 is connected fast to the solar gearwheel 41 of the second main planetary gearwheel assembly NS2.

The reduction and main planetary gear sets VS and NS are arranged with parallel axes axially next to one another, with an offset between their central axes. According to the invention, the spur gear arrangement ST is arranged axially between the reduction and main planetary gear sets VS and NS.

The web 45 of the second main planetary gearwheel assembly NS2 and the annular gearwheel 33 of the first main planetary gearwheel assembly NS1 coupled to the web 45 can be fixed by means of the third shift element L of the main planetary gear set NS, which is made as a brake. The annular gearwheel 43 of the second main planetary gearwheel assembly NS2 and the web 35 of the first main planetary gearwheel assembly are coupled, forming the output drive of the main planetary gear set NS (rotation speed nns) and being connected to the drive output shaft 3 of the gearbox.

In the example embodiment, according to FIG. 1A, both spur gear stages ST11/ST12 and ST21/ST22 have a transmission ratio of "one". Obviously, in other embodiments of a multi-stage gearbox according to the invention, other transmission ratios could be provided. The spur gear stages ST11/ST12 and ST21/ST22 could also have different transmission ratios or even more than two spur gearwheels in each spur gear stage or indeed a different number of spur gearwheels in each spur gear stage.

For the speeds of the shifts and shift elements, the following can be said concerning the first embodiment of a multi-stage gearbox according to the invention:
1. The transmission ratio of the two spur gear stages ST11/ST12 and ST21/ST22 is "one".
2. The speeds of the drive input shaft 1 and of shift element H are equal (input speed n).
3. The speed of the engaged shift element A is "zero".
4. The speed of the engaged shift element B is "zero".
5. The speed of the engaged shift element D is "zero".
6. The speed of the engaged shift element L is "zero".
7. When shift elements H and M are engaged, the speed of the central gearwheel of the second main planetary gearwheel assembly NS2 connected to the output shaft 2 is equal to or greater than a speed nvs produced by the reduction planetary gear set VS.
8. When shift elements A and D are engaged, the speed of the shaft which connects shift element B with a central gearwheel of the second reduction planetary gearwheel assembly VS2, is smaller than or equal to the speed produced when shift element B is actuated.
9. When shift element A is engaged, the speed of the shaft connecting shift element B to the central gearwheel of the second reduction planetary gearwheel assembly VS2 is greater than or equal to the speed produced when shift element B is actuated.
10. The speed of shift element M when engaged is larger than zero and smaller than or equal to the input speed n of the drive input shaft 1, and
11. When shift elements L and M are engaged, the speed of the central gearwheel of the second main planetary gearwheel assembly NS2 connected to the output shaft 2 is smaller than or equal to the speed nvs produced by the reduction planetary gear set VS.

With the arrangement of FIG. 1A by selective closing of the six shift elements, the nine forward gears and one reverse gear listed in the table of FIG. 1B can be engaged without range-change, in very harmonious steps and with a large spread. In this, three of the forward gears are designed as drive input speed reducing, overdrive gears.

Advantageously, four of the six shift elements are made as brakes with correspondingly favorable constructive effort, particularly in relation to their pressure oil supply. The coupling of the reduction and main planetary gear sets, via a fixed spur gear stage, according to the invention, enables very compact, multiple-gear multi-stage gearboxes and is particularly appropriate for applications in motor vehicles with drive motors arranged transversely to the driving direction ("front transverse drive" or "rear transverse drive"). In this, the offset arrangement of the drive input and output shafts of the gearbox make it possible to use spur gearwheels of relatively small diameter.

Figure 2A:
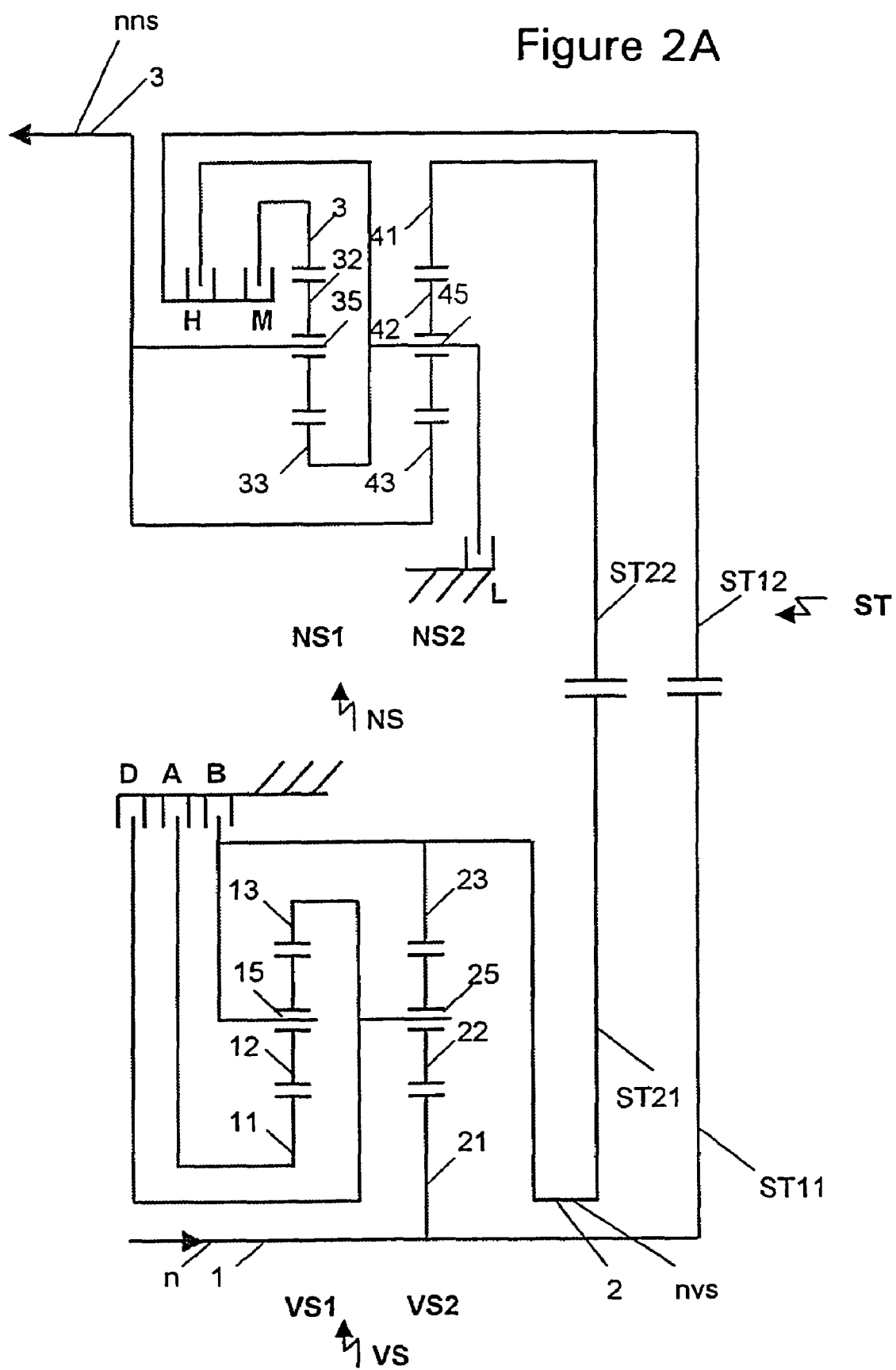

FIG. 2A shows the transmission scheme of a second example embodiment of a multi-stage gearbox according to the invention. In contrast to the first embodiment described above, the reduction and main planetary gear sets VS and NS are arranged axis-parallel and in one plane. The spur gear stage ST that connects the reduction and main planetary gear sets VS and NS is now arranged axially adjacent to the reduction and main planetary gear sets VS and NS. The drive output shaft 3 of the gearbox is again axis-parallel to the drive input shaft 1.

The design of the reduction planetary gear set VS with two shiftable reduction planetary gearwheel assemblies VS1, VS2 coupled as two-web, four-shaft transmission units and three brakes A, B, D and the design of the main planetary gear set NS with two shiftable main planetary gearwheel assemblies NS1, NS2 coupled as two-web, four shaft transmission units and with two clutches M, H and a brake L, corresponds unchanged to that of the embodiment shown in FIG. 1A.

As shown in FIG. 2A, the spur gear arrangement ST still comprises spur gearwheel pairs ST11/ST12 and ST21/ST22. The spur gearwheel ST12 that meshes with ST11 can be connected to the solar gearwheel 31 of the first main planetary gearwheel assembly NS1 by means of the first shift element M of the main planetary gear set NS, which is formed as a clutch, and to the annular gearwheel 33 of the first main planetary gearwheel assembly NS1 and the web 45 of the second main planetary gearwheel assembly NS2 coupled to the annular gearwheel 33 by means of the second shift element H of the main planetary gear set, which is also formed as a clutch. The spur gearwheel ST22 that meshes with ST21 is connected fast to the solar gearwheel 41 of the second main planetary gearwheel assembly NS2.

Owing to its very short axial extension, the second embodiment of a multi-stage gearbox is, according to the invention, in a particularly advantageous way, well suited for arrangements in motor vehicles having the drive motor positioned transversely to the driving direction with axially restricted structural space for the gearbox.

As in the first embodiment of a multi-stage gearbox, according to the invention described earlier, in the second embodiment the two spur gearwheel stages ST11/ST12 and ST21/ST22 of the spur gear arrangement ST again have transmission ratios of "one". Obviously, in this case too, other transmission ratios can be provided, for example, in order to adapt the spur gearwheel diameter to an existing structural space. The spur gearwheel stages ST11/ST12 and ST21/ST22 can also have different transmission ratios. In another design, it can be provided that the driving and driven shafts of the spur gear arrangement ST are not axis-parallel. In a further design, it can also be provided that the two spur gearwheel stages of the spur gear arrangement ST each have more than two spur gearwheels or even a different number of spur gearwheels in each spur gearwheel stage.

Figure 3A:
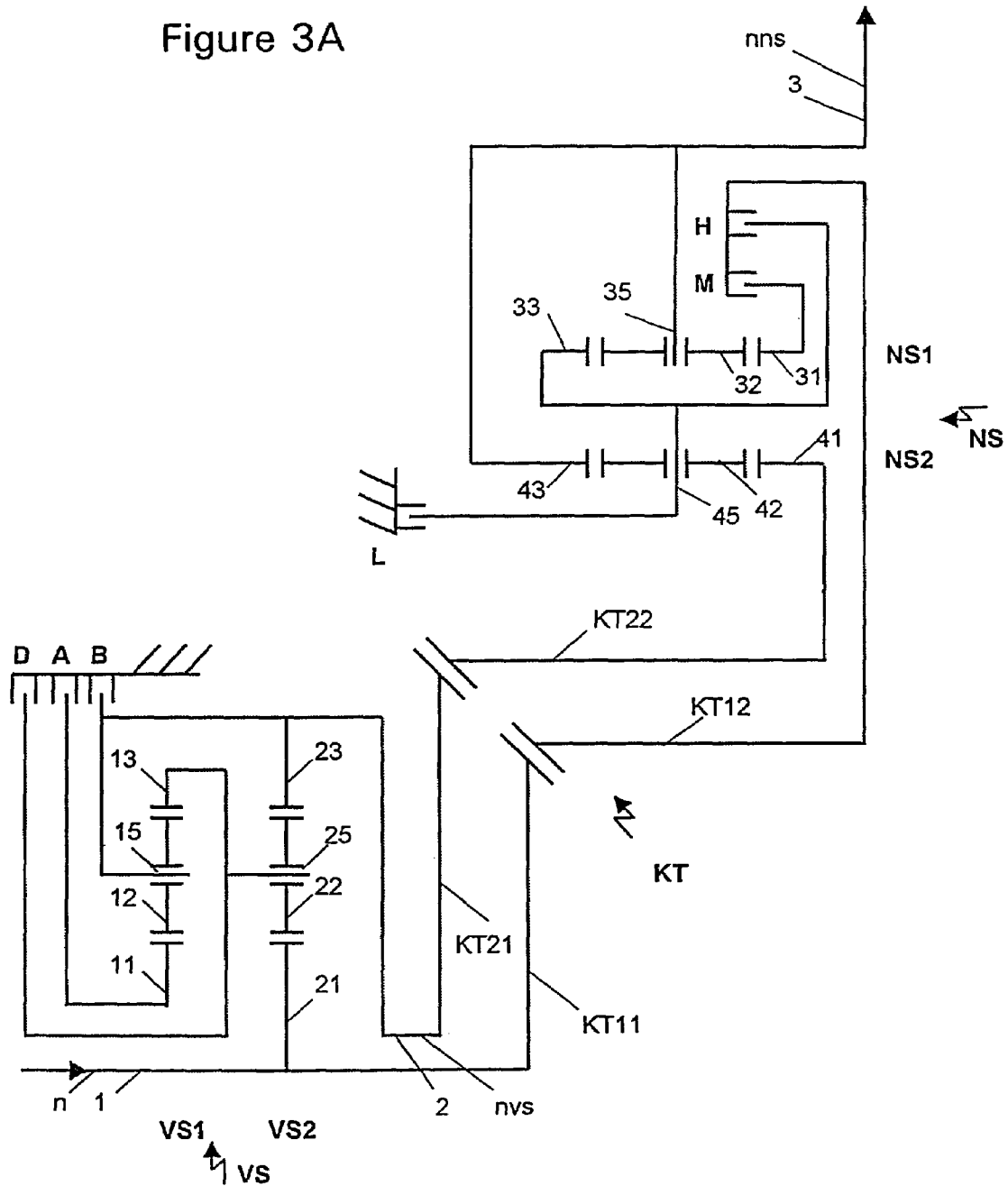
FIG. 3A third embodiment of a multi-stage gearbox with a bevel gear coupling between the reduction and main planetary gear sets according to the presently claimed invention.

FIG. 3A now shows the transmission scheme of a third embodiment of a multi-stage gearbox according to the invention. In contrast to the first and second embodiments described earlier, the reduction and main planetary gear sets VS and NS are this time connected to one another via a bevel gearwheel stage KT instead of via the spur gearwheel stage ST. The respective central axes of the reduction and main planetary gear sets VS and NS are preferably at a right-angle to one another, so that the reduction and main planetary gear sets VS and NS are arranged next to one another largely without spatial overlap.

The bevel gear arrangement KT, however, can also have some other angle between its driving and driven shafts. Besides, the bevel gear arrangement KT can be made as a right-angle or non right-angle hypoid bevel gear arrangement with an axial offset, i.e., as a so-termed bevel worm gear.

The design of the reduction planetary gear set VS with two shiftable reduction planetary gearwheel assemblies VS1, VS2 coupled as two-web, four shaft transmission units and three brakes A, B, D and the design of the main planetary gear set NS with two shiftable main planetary gearwheel assemblies NS1, NS2 coupled as two-web, four shaft transmission units and with two clutches M, H and a brake L corresponds unchanged to that of the embodiments shown in FIGS. 1A and 2A.

As shown in FIG. 3A, the bevel gear arrangement KT comprises bevel gearwheel pairs KT11/KT12 and KT21/KT22. The bevel gearwheel KT12 that meshes with KT11 can be connected to the solar gearwheel 31 of the first main planetary gearwheel assembly NS1 by means of the first shift element M of the main planetary gear set NS, which is made as a clutch, and to the annular gearwheel 33 of the first main planetary gearwheel assembly NS1 and the web 45 of the second main planetary gearwheel assembly NS2 coupled to the annular gearwheel 33 by means of the second shift element H of the main planetary gear set NS, also made as a clutch. The bevel gearwheel KT22 that meshes with KT21 is connected fast to the solar gearwheel 41 of the second main planetary gearwheel assembly NS2.

In the third example embodiment of a multi-stage gearbox according to the invention shown in FIG. 3A, the two bevel gearwheel pairs KT11/KT12 and KT21/KT22 are made with a transmission ratio of "one". Obviously, in this case too, other transmission ratios can be provided, for example, in order to adapt the bevel gearwheel diameter to an existing structural space. The bevel gearwheel pairs KT11/KT12 and KT21/KT22 can also have different transmission ratios.

Owing to the angle between the reduction and main planetary gear sets, the third example embodiment of a multi-stage gearbox, according to the invention, described is well suited for application in a motor vehicle, in a particularly advantageous way, with its drive motor arranged longitudinally relative to the driving direction ("front longitudinal drive", "rear longitudinal drive"), but also in motor vehicles with all-wheel drives.

In a further development of the invention (not illustrated here), it can also be provided that the spur gear arrangement ST, according to the invention, between the reduction and main planetary gear sets VS and NS is replaced by a chain drive. Between the connection shaft 2 and the main planetary gear set NS, and between the drive input shaft 1 and the main planetary gear set NS, in each case there are a driving and a driven wheel and in each case traction means, for example, a chain or a toothed belt, to transfer torque between the driving and the driven wheel.

In principle, instead of the chain drive, which transfers torque in a form-enclosed way, a wrap-around drive can also be provided, which transfers torque by friction force, for example, via a V-belt.

In a design of the chain drive or wrap-around drive, only a single chain or a single wrap-around element can be provided, which is arranged either between the connection shaft 2 and the main planetary gear set NS or between the drive input shaft 1 and the main planetary gear set NS, while the respective other mechanical connection to the main planetary gear set NS is then formed as a single spur gear stage preferably with three spur gearwheels.

REFERENCE NUMERALS

VS Reduction planetary gear set
VS1 First reduction planetary gearwheel assembly
VS2 Second reduction planetary gearwheel assembly
NS Main planetary gear set
NS1 First main planetary gearwheel assembly
NS2 Second main planetary gearwheel assembly
ST Spur gear arrangement
ST11/ST12 First spur gearwheel stage between the drive input shaft and the main planetary gear set
ST21/ST22 Second spur gearwheel stage between the connection shaft and the main planetary gear set
ST11 Input-side spur gearwheel of the first spur gear stage
ST12 Output-side spur gearwheel of the first spur gear stage
ST21 Input-side spur gearwheel of the second spur gear stage
ST22 Output-side spur gearwheel of the second spur gear stage
KT Bevel gear arrangement
KT11/KT12 First bevel gearwheel stage between the drive input shaft and the main planetary gear set
KT21/KT22 Second bevel gearwheel stage between the connection shaft and the main planetary gear set
KT11 Input-side bevel gearwheel of the first bevel gear stage
KT12 Output-side bevel gearwheel of the first bevel gear stage
KT21 Input-side bevel gearwheel of the second bevel gear stage
KT22 Output-side bevel gearwheel of the second bevel gear stage
A, B, D First to third shift elements of the reduction planetary gear set
M, H, L First to third shift elements of the main planetary gear set
n Input speed of the drive input shaft
nvs Output speed of the reduction planetary gear set
nns Output speed of the main planetary gear set
1 Drive input shaft
2 Output shaft of the reduction planetary gear set
3 Drive output shaft
11 Solar gearwheel of gearwheel assembly VS1
12 Planetary gearwheel of gearwheel assembly VS1
13 Annular gearwheel of gearwheel assembly VS1
15 Web gearwheel of gearwheel assembly VS1
21 Solar gearwheel of gearwheel assembly VS2
22 Planetary gearwheel of gearwheel assembly VS2
23 Annular gearwheel of gearwheel assembly VS2
25 Web gearwheel of gearwheel assembly VS2
31 Solar gearwheel of gearwheel assembly NS1
32 Planetary gearwheel of gearwheel assembly NS1
33 Annular gearwheel of gearwheel assembly NS1
35 Web gearwheel of gearwheel assembly NS1
41 Solar gearwheel of gearwheel assembly NS2
42 Planetary gearwheel of gearwheel assembly NS2
43 Annular gearwheel of gearwheel assembly NS2
45 Web gearwheel of gearwheel assembly NS2

What is claimed is:

1. A multi-stage gearbox, with a drive input shaft (1) connected to a reduction planetary gear set (VS), with a drive output shaft (3) arranged non-coaxially to the drive input shaft (1) and connected to a main planetary gear set (NS), with shift elements (A, B, D) that act on the reduction planetary gearset (VS) and shift elements (M, H, L) that act on the main planetary gear set (NS), such that by selective actuation of the shift elements (A, B, D, M, H, L) an input speed (n) of the drive input shaft (1) can be transferred for the engagement of at least seven forward gears at the drive output shaft (3) in such manner that to shift from one gear to the next-higher or next-lower gear of the shift elements actuated at the time in each case only one shift element is disengaged and one other shift element is engaged wherein the reduction planetary gear set (VS) comprises just one output shaft (2) rotating at an output speed (nvs) of the reduction planetary gear set (VS), the main planetary gear set (NS) can be connected to the drive input shaft (1) by means of at least one second shift element (M, H) acting on the main planetary gear set (NS) via a first spur gearwheel stage (ST11/ST12) of a spur gear arrangement ST, and the main planetary gear set (NS) is connected to the output shaft (2) of the reduction planetary gear set (VS) via a second spur gearwheel stage (ST21/ST22) of the spur gear arrangement (ST).

2. The multi-stage gearbox according to claim 1, wherein both spur gearwheel stages (ST11/ST12, ST21/ST22) of the spur gear arrangement (ST) have a transmission ratio of one.

3. The multi-stage gearbox according to claim 1, wherein both spur gearwheel stages (ST11/ST12, ST21/ST22) of the spur gear arrangement (ST) have a transmission ratio larger or smaller than one.

4. The multi-stage gearbox according to claim 1, wherein the spur gearwheel stages (ST11/ST12, ST21/ST22) of the spur gear arrangement (ST) each have non axis-parallel driving and driven axles.

5. The multi-stage gearbox according to claim 1, wherein the spur gearwheel stages (ST11/ST12, ST21/ST22) of the spur gear arrangement (ST) are each formed of a pair of spur gearwheels (ST11 and ST12, and ST21 and ST22), respectively.

6. The multi-stage gearbox according to claim 1, wherein the spur gearwheel stages (ST11/ST12, ST21/ST22) of the spur gear arrangement (ST) each comprise more then two spur gearwheels.

7. The multi-stage gearbox according to claim 1, wherein the spur gearwheel stages (ST11/ST12, ST21/ST22) of the spur gear arrangement (ST) comprise a different number of spur gearwheels.

8. The multi-stage gearbox according to claim 1, wherein the reduction planetary gear se (VS) and the main planetary gearset (NS) are arranged axis-parallel substantially in one plane, and the spur gear arrangement (ST) is arranged axially next to the reduction and main planetary gear sets (VS, NS) on the side thereof facing away from a drive motor of the multi-stage gearbox.

9. The multi-stage gearbox according to claim 1, wherein the reduction planetary gear set (VS) comprises at least two coupled, non-shiftable reduction planetary gearwheel assemblies (VS1, VS2), and the main planetary gear set (NS) comprises at least two coupled main planetary gearwheel assemblies (NS1, NS2), at least one of the main planetary gearwheel assemblies (NS1, NS2) being shiftable.

10. The multi-stage gearbox according to claim 1, wherein the reduction planetary gear set (VS) comprises at least two coupled reduction planetary gearwheel assemblies (VS1, VS2), at least one of the said reduction planetary gearwheel assemblies (VS1, VS2) being shiftable, the main planetary gear set (NS) comprises at least two main planetary gearwheel assemblies (NS1, NS2), at least one of the said main planetary gearwheel assemblies (NS1, NS2) being shiftable, and the output speed (nvs) of the reduction planetary gear set (VS) is produced by selective closing of the shift elements (A, B, D) acting on the reduction planetary gear set (VS).

11. The multi-stage gearbox according to claim 9, wherein the output shaft (2) of the reduction planetary gear set (VS) is connected to a central gearwheel of the second main planetary gearwheel assembly (NS2) via the second spur gearwheel stage (ST21/ST22) of the spur gear assembly (NS2) via the second spur gearwheel stage (ST21/ST22) of the spur gear arrangement (ST) or the second bevel gear pair (KT21/KT22 of the bevel gear arrangement (KT).

12. The multi-stage gearbox according to claim 9, wherein the multi-stage gearbox comprises two reduction planetary gearwheel assemblies (VS1, VS2), two main planetary gearwheel assemblies (NS1, NS2), and a total of six shift elements (A, B, D, M, H, L), and a total of nine forward gears can be engaged.

13. The multi-stage gearbox according to claim 10, wherein following features:
the reduction planetary gear set (VS) comprises three shift elements (A, B, D) and two coupled, shiftable reduction planetary gearwheel assemblies (VSI, VS2), each with a solar gearwheel (11, 21), an annular gearwheel (13, 23) and a web (15, 25) with planetary gearwheels (12, 22);
the main planetary gear set (NS) comprises three shift elements (H, M, L) and two coupled, shiftable main planetary gearwheel assemblies (NS1, NS2), each with a solar gearwheel (31, 41), an annular gearwheel (33, 43) and a web (35, 45) with planetary gearwheels (32, 42);
the spur or bevel gear arrangement (ST or KT) comprises the first spur gearwheel stage (ST11/ST12) or the first bevel gearwheel stage (KT11/KT12) with a spur or bevel gearwheel (ST11 or KT11) on an input side and a spur or bevel gearwheel (ST12 or KT12) on an output side, and a second spur gearwheel stage (ST21/ST22) or a first bevel gearwheel stage (KT21/KT22) with a spur or bevel gearwheel (ST21 or KT21) on the input side and a spur or bevel gearwheel (ST22 or KT22) on the output side;
the solar gearwheel (11) of the first reduction planetary gearwheel assembly (VS1) can be fixed by means of the first shift element (A) of the reduction planetary gear set (VS);
the solar gearwheel (21) of the second reduction planetary gearwheel assembly (VS2) is connected to the drive input shaft (1);
the annular gearwheel (13) of the first reduction planetary gearwheel assembly (VS1) and the web (25) of the second reduction planetary gearwheel assembly (VS2) are connected to one another and can be fixed by means of the third shift element (D) of the reduction planetary gear set (VS);
the annular gearwheel (23) of the second reduction planetary gearwheel assembly (VS1) and the web (15) of the first reduction planetary gearwheel assembly (VS2) are connected to one another and to the output shaft (2) of the reduction planetary gear set (VS), and can be fixed by means of the second shift element (B) of the reduction planetary gear set (VS);
the drive input shaft (1) is connected to the spur or bevel gearwheel (ST11 or KT11) of the first spur gear stage (ST11/ST12) or the first bevel gearwheel pair (KT11/KT12) on the input side;
the output shaft (2) of the reduction planetary gear set (VS) is connected to the spur or bevel gearwheel (ST21 or KT21) of the second spur gear stage (ST21/ST22) or the second bevel gearwheel pair (KT21/KT22) on the input side;

the solar gearwheel (31) of the first main planetary gearwheel assembly (NS1) can be connected by means of the first shift element (M) of the main planetary gear set (NS) to the spur or bevel gearwheel (ST12 or KT12) of the first spur gear stage (ST11/ST12) or the first bevel gear pair (KT11/KT12) on the output side;

the solar gearwheel (41) of the second main planetary gearwheel assembly (NS2) is connected to the spur or bevel gearwheel (ST22 or KT22) of the second spur gear stage (ST21/ST22) or the second bevel gear pair (KT21/KT22 on the output side;

the annular gearwheel (33) of the first main planetary gearwheel assembly (NS1) and the web (45) of the second main planetary gearwheel assembly (NS2) are connected together, can be connected by means of the second shift element (H) of the main planetary gear set (NS) to the spur or bevel gearwheel (ST12 or KT12) of the first spur gear stage (ST11/ST12) or the first bevel gear pair (KT11/KT12) on the output side, and can be fixed by means of the third shift element (L) of the main planetary gear set (NS); and the annular gearwheel (43) of the second main planetary gearwheel assembly (NS2) and the web (35) of the first main planetary gearwheel assembly (NS1) are connected together and to the drive output shaft (3).

\* \* \* \* \*